(12) United States Patent
Coon et al.

(10) Patent No.: US 7,401,805 B2
(45) Date of Patent: Jul. 22, 2008

(54) CURTAIN AIR BAG MODULE

(75) Inventors: Jeffery S. Coon, Sterling Heights, MI (US); Chang-Hwan Ju, Rochester, MI (US)

(73) Assignee: Key Safety Systems, Inc, Sterling Heights, MI (US)

( * ) Notice: Subject to any disclaimer, the term of this patent is extended or adjusted under 35 U.S.C. 154(b) by 102 days.

(21) Appl. No.: 11/283,312

(22) Filed: Nov. 18, 2005

(65) Prior Publication Data
US 2006/0119084 A1   Jun. 8, 2006

Related U.S. Application Data

(60) Provisional application No. 60/634,023, filed on Dec. 6, 2004.

(51) Int. Cl.
*B60R 21/213* (2006.01)

(52) U.S. Cl. .................................................. 280/730.2

(58) Field of Classification Search ............. 280/730.2, 280/728.2, 743.1, 743.2
See application file for complete search history.

(56) References Cited

U.S. PATENT DOCUMENTS

| | | | | |
|---|---|---|---|---|
| 5,540,459 A | * | 7/1996 | Daniel ..................... | 280/730.2 |
| 6,149,185 A | * | 11/2000 | White et al. ............. | 280/730.2 |
| 6,224,091 B1 | * | 5/2001 | Eyrainer et al. .......... | 280/730.2 |
| 6,305,707 B1 | * | 10/2001 | Ishiyama et al. ......... | 280/728.2 |
| 6,364,349 B1 | | 4/2002 | Kutchey et al. | |
| 6,626,457 B2 | * | 9/2003 | Masuda et al. ........... | 280/728.2 |
| 6,902,187 B2 | * | 6/2005 | Sonnenberg ............. | 280/730.2 |
| 7,163,231 B2 | * | 1/2007 | Kumagai ................. | 280/730.2 |
| 2001/0030417 A1 | * | 10/2001 | Kolb ....................... | 280/743.1 |
| 2002/0130494 A1 | * | 9/2002 | Blake et al. .............. | 280/730.2 |
| 2003/0090092 A1 | | 5/2003 | Salze | |
| 2003/0205887 A1 | * | 11/2003 | Wallner et al. ........... | 280/730.2 |
| 2004/0108693 A1 | | 6/2004 | Foster et al. | |
| 2005/0104335 A1 | * | 5/2005 | Henderson et al. ....... | 280/728.2 |
| 2005/0225060 A1 | * | 10/2005 | Wold ....................... | 280/728.2 |

FOREIGN PATENT DOCUMENTS

EP   0957010 A2   11/1999

* cited by examiner

*Primary Examiner*—Christopher Ellis
*Assistant Examiner*—Robert A. Coker
(74) *Attorney, Agent, or Firm*—Markell Seitzman (57) ABSTRACT

A curtain air bag module (100) comprising and air bag (102) having at least one inflatable region with internally configured internal tethers and a deflector or ramp locatable above a B-pillar trim part and loosely mounted to the vehicle and to the trim part.

18 Claims, 9 Drawing Sheets

Fig - 13

CURTAIN AIR BAG MODULE

This application claims the benefit of U.S. Provisional Application No. 60/634,023, filed on Dec. 6, 2004. The disclosure of the above application is incorporated herein by reference.

BACKGROUND AND SUMMARY OF THE INVENTION

The present invention generally relates to inflatable restraints for motor vehicles and more specifically to a curtain air bag installed along the roof rail of a vehicle.

Figure 1:
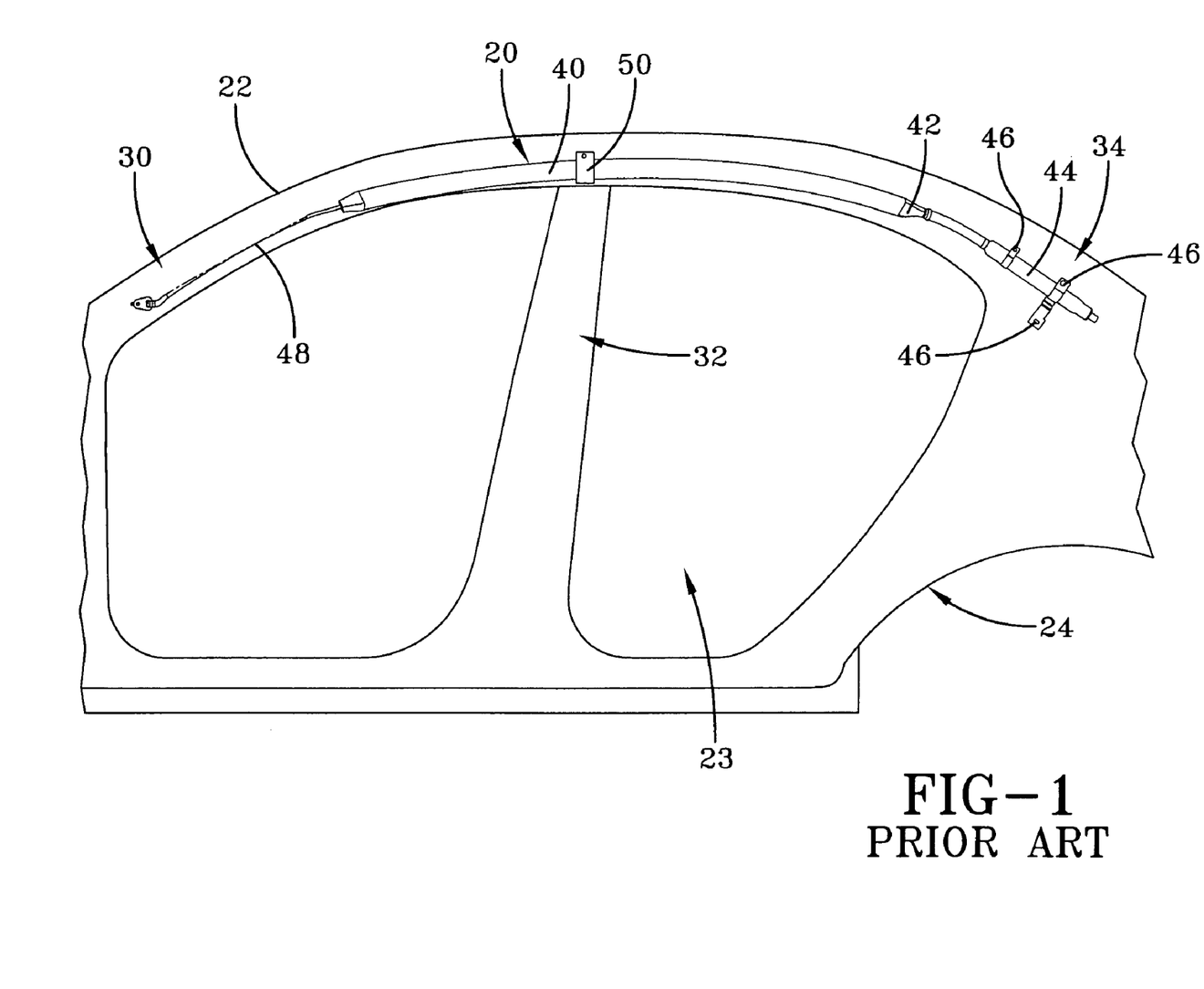
FIG. 1 illustrates a typical mounting relationship of a curtain air bag module within a vehicle's passenger compartment.

Reference is briefly made to FIG. 1, which illustrates a prior art curtain air bag module 20 installed along the roof rail 22 of a passenger compartment 23 of a vehicle 24. In typical curtain air bag installations the air bag extends from the A-pillar 30 across the B-pillar 32 to the C-pillar 34 of the vehicle. Generally, the air bag module 20 comprises a rectangular or oblong air bag 40 folded or rolled into a cylindrical configuration. While in this compact configuration, the air bag is slid into a cover that can take many shapes; one such cover is a long cylindrical, perforated or breakable covering or sleeve, which maintains the air bag in its folded or rolled condition.

The air bag will generally include an inlet 42 in communication with an inflator 44. The inflator may be directly connected to the inlet or inserted within a housing for an indirect connection. In other installations the inlet is formed by an opening in an inflatable portion of the air bag and the inflator is inserted directly therein. The inflator is appropriately fastened, using one or more fasteners or brackets 46, to the appropriate vehicle structure. As illustrated in FIG. 1, the inflator is mounted in the C-pillar; however, the inflator 44 can be mounted proximate the B or A-pillars. Further, as known in the art, the lower corners of the air bag are often secured to adjacent corresponding pillars by a strap, which is often called a tether. One forward strap 48 is shown in FIG. 1 in its stored configuration along the A-pillar. The various components shown in FIG. 1 are covered by one or more trim pieces hiding them in normal use. As mentioned, the air bag module is typically secured to the roof rail by a plurality of fasteners, which secure the inflator and also secure the air bag. The module may also include a deflector or ramp 50 located proximate the B-pillar, which urges the air bag as it inflates to move away from the B-pillar.

It is an object of the present invention to provide an improved curtain air bag module.

Accordingly the invention comprises: an improved deflector or ramp that is not fixedly fastened to the vehicle, B-pillar or to the B-pillar trim. The improved ramp is used in conjunction with and forms a part of a curtain air bag module comprising an air bag having at least one inflatable region. The air bag generally may include a distribution tube located proximate a top portion of the at least one inflatable region of the air bag, the tube having a first end adapted to receive inflation gas, the distribution tube including at least one set of openings operatively associated with the inflatable region for communication of inflation gas to these regions. The air bag further includes a plurality of tabs, which extend through an optional, hollow tubular covering placed about the air bag. These tabs are secured proximate the roof rail of the vehicle. In the illustrated embodiment, the air bag includes two major inflatable regions positioned laterally of each other with added passages interconnecting the major inflatable regions. One of the tabs, upon extending through the cover, also extends through the deflector or ramp.

Many other objects and purposes of the invention will be clear from the following detailed description of the drawings.

DETAILED DESCRIPTION OF THE DRAWINGS

The present invention comprises an improved bracket, deflector or ramp 230 or 230a (see FIG. 13) for a curtain air bag, which is part of an air bag module. The ramp has a hollow body 235 through which a folded curtain air bag is received. The ramp is usable with many different types of air bags and modules. Air bag module 100 (see FIG. 2) and air bag 102 are exemplary of those modules and air bags that can use the new ramp 230. The module 100 also comprises an air bag 102, an inflator 104 mounted within a hollow, tubular housing 106; the housing 106 is secured to the C-pillar 34 such as by threaded fasteners 107 received through mating connectors or brackets 108 that are formed as part of the housing. The housing 106 can be as simple as the brackets themselves or, for example, the housing can be a cylindrical tube configured to receive a cylindrical inflator.

Figure 2:
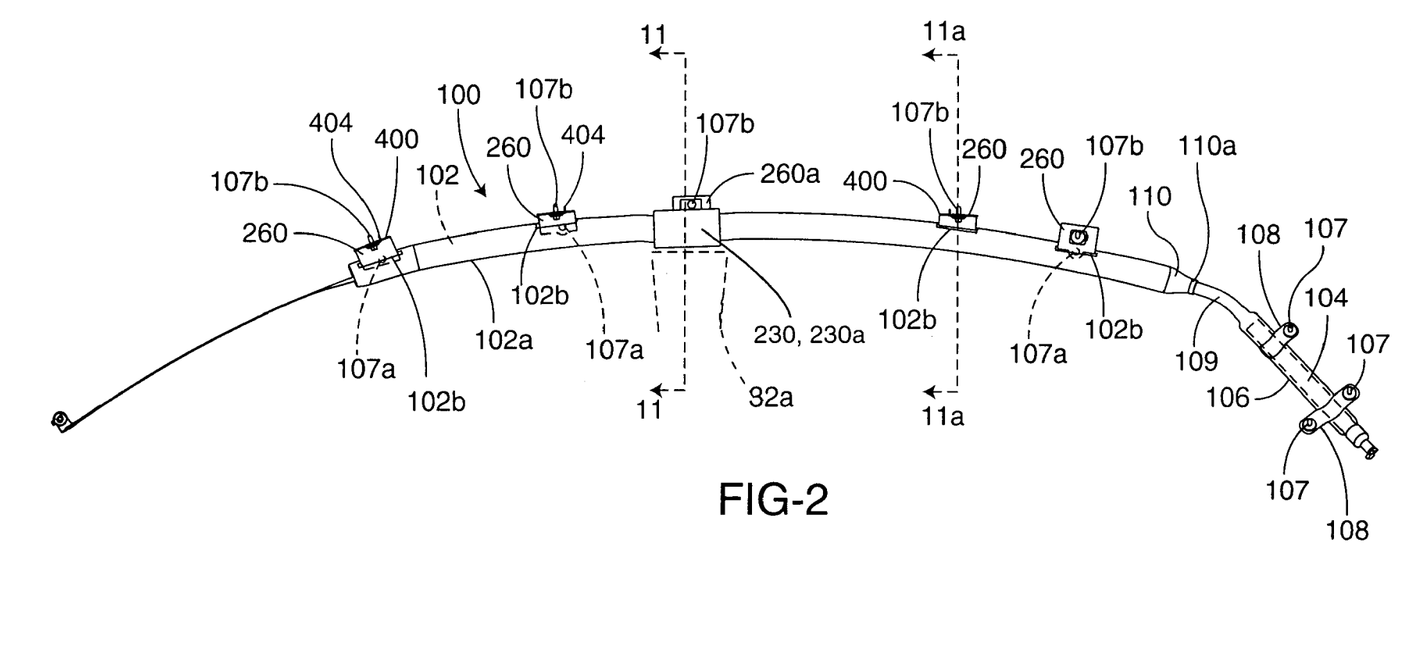
FIG. 2 shows many of the components of a curtain air bag module according to the current invention.
Figure 2A:
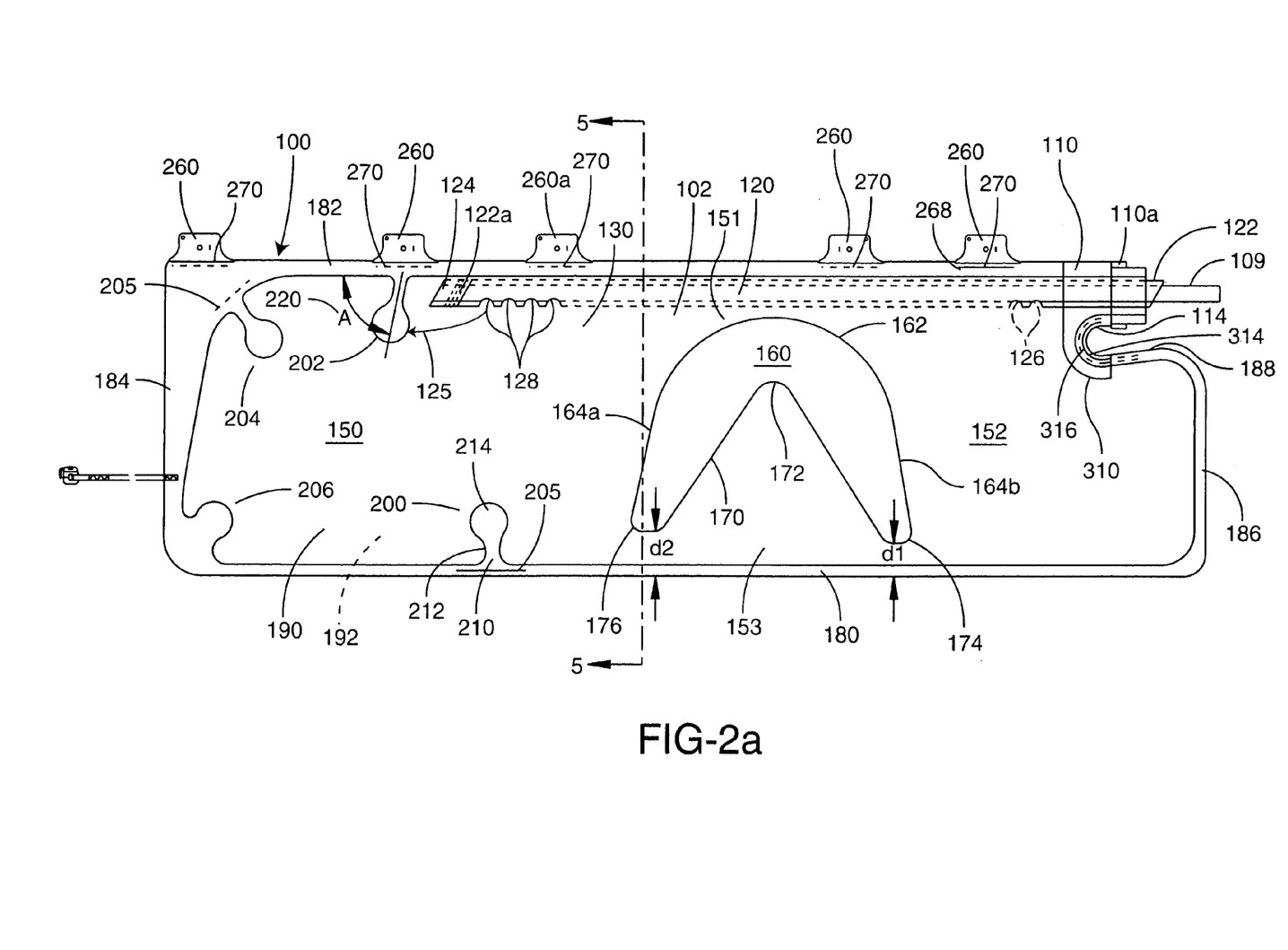
FIG. 2a shows the air bag in an inflated configuration.
Figure 11:
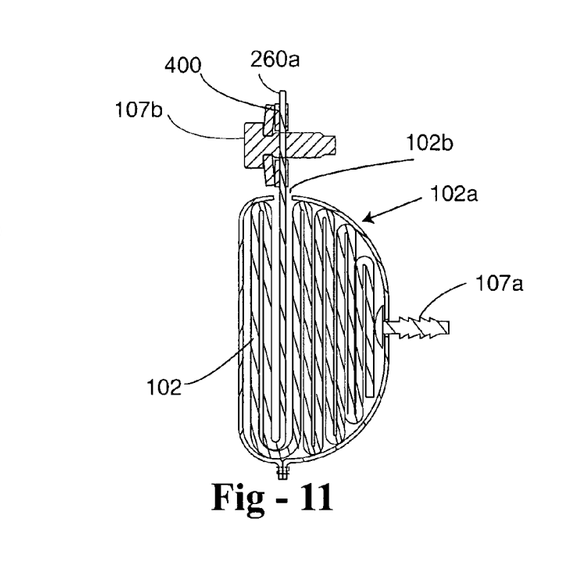
FIG. 11 is a cross-sectional view showing the location of a pushpin through a covering placed about the folded air bag.

The air bag is shown in FIG. 2 in its stored configuration and in an inflated or laid-out condition in FIG. 2a. In the stored configuration the air bag is covered with a thin, long tearable covering 102a, which is generally known in the art. A plurality of the fasteners 107a, such as plastic pushpins, extends through a like plurality of openings in the covering as shown in FIGS. 2 and 11. These fasteners 107a extend out rearward from the covering 102a. During installation of the module onto the roof rail, the module is initially aligned to the roof rail and the fasteners 107a are pushed into openings in the roof rail, thereby providing a first step in the mounting of the module. Subsequently, with the module 100 generally in place, the module is further secured to the roof rail by another set of threaded fasteners 107b. As will be described below, these fasteners 107b extend through flaps or tabs 260 of the air bag 102 and through an anti-rotation member 400. A fastener 107a is not associated with ramp 230.

The exemplary air bag 102 includes a region communicated with the inflator; this region is generally referred to as a neck or neck portion 110 and can take many shapes. In the illustrated embodiment, the neck or neck portion 110 is in operative communication with an extension tube 109 (see FIG. 2a) of the housing (see FIG. 2). Alternately, the neck is connected directly about the inflator if a housing is not used.

Figure 3:
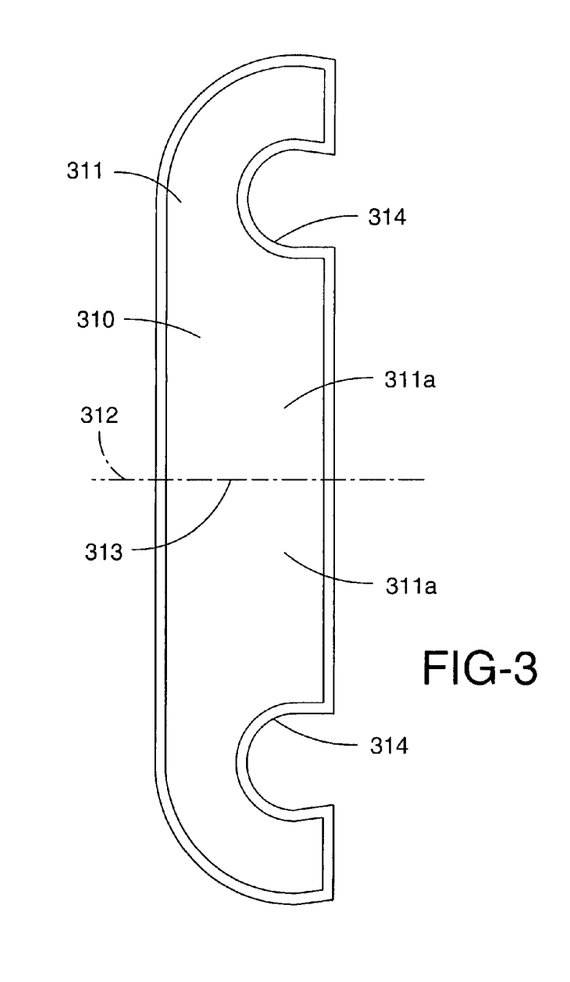
FIG. 3 illustrates the construction of the neck of the air bag.

It is difficult to have the neck of the air bag lie flat, since the inflator 104 or tube 109 causes the neck to take a circular profile (in cross-section). The air bag 102 further includes, proximate the neck 110, a reinforcement panel 310, which is fitted about the exterior of the air bag to provide additional strength to the neck 110, as well as an added fabric layer, which protects the neck portion 110 from damage. The panel 310 is shown in FIG. 3 and includes an oblong body 311 with opposing halves 311a located about a centerline 312. At least one slot 313 is formed along the centerline 312. The body includes opposing symmetrically positioned notches 314. The panel 310 is folded over the centerline 312 to achieve the general shape shown in FIG. 2a.

Figure 4:
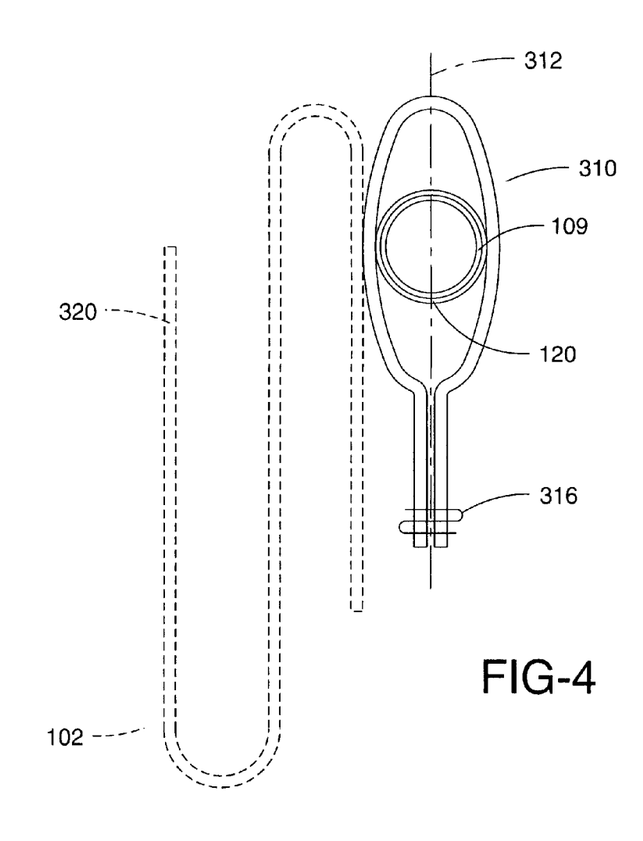
FIG. 4 shows the construction of the neck and neck reinforcement portion of the air bag and also shows a distribution tube located in the neck portion.

The notches 314 are aligned with similarly shaped notches 114 formed in the neck 110. The neck panel 310 is sewn to the air bag at a seam 316, which secures each panel half 311a to opposite sides of the neck 110. The neck 110, neck panel (and a distribution tube discussed below) are secured about distribution tube 109 by a circular, hoop or ring-type fastener 110a as shown in FIGS. 2 and 2a. Reference is made to FIG. 4, which shows the neck 110 in cross-section and also shows other portions 320 (in phantom line) of the air bag 102 folded and closely positioned to the neck in the relative placement these other portions would take in the stored configuration of the air bag. As can be appreciated, the panel 310 prevents these other portions 320 of the air bag 102 from rubbing against the material forming the neck 110 as the air bag inflates.

The air bag 102 further includes a distribution tube 120. The distribution tube is inserted within the neck 110 and positioned adjacent the upper side of the air bag. The distribution tube 120 has a first end 122 received within the neck and also positioned about the housing extension 109 and secured in a fluid-tight manner by the fastener 110a (see FIG. 2a). Tube 120 includes another end 124, which may be opened or, as illustrated, closed such as by stitches or staples. The tube further includes a plurality of openings 126 positioned proximate the neck and a further plurality of openings 128 positioned proximate end 124. In a preferred embodiment, the number of openings 126 is two, while the number of openings 128 is four. The reason for this construction is to distribute the inflatable gas into the air bag so the front and the rear of the curtain air bag fill uniformly and quickly at all operating temperatures.

The tube can be a solid, extruded metal tube or, alternatively, made from a dense, woven material. The above material choices are known in the art. As mentioned, the tube is received within the upper portion 130 of the air bag and can be held in place by a fastener such as a thin breakable wire or plastic strip or even a sewn stitch, collectively 122a, that extends through the tube and the various panels of the air bag to hold end 124 in place, while not appreciably restricting the dimension of the opened diameter of the distribution tube 120.

As shown in FIG. 2a, the air bag further includes a forward or first inflatable chamber 150 and a rear inflatable chamber 152. The chambers 150 and 152 communicate with each other via open regions on the air bag that form passages 151 and 153 linking the chambers. The passages 151 and 153 can also be inflatable regions of the air bag.

Positioned between chambers 150 and 152 is an optional non-inflatable region 160. The non-inflatable region includes an arcuately shaped upper surface 162, typically shaped as a segment of a circle and two tangentially extending straight portions 164a and 164b to avoid unnecessary stress risers forming as the air bag inflates. The lower portion of the non-inflatable region is triangularly shaped as designated by reference line 170 having two descending lobes. The center 172 of the lower triangular shape 170 is arcuately shaped. The non-inflatable portion includes first and second arcuately shaped ends 174 and 176. Each of the ends 174 and 176 is spaced a predetermined distance from the lower edge or seam 180 to reduce cushion stiffness from chamber 150 of the air bag 102. As illustrated in this embodiment of the invention, the distance d1 between end 174 and the lower edge 180 of the air bag is smaller than the distance d2 between end 176 and edge 180 of the air bag.

The air bag includes an upper edge 182, as well as lateral edges 184 and 186, which together define the periphery of the air bag. Edge 186 includes a concave portion 188 that defines the elongated shape of the neck 110.

In general, the inflatable portions of the air bag are formed by a first and second, or inner 190 and outer 192 fabric or panel. As illustrated in FIG. 2a, only the inner panel 190 is visible; the outer panel 192 is generally identical and shown in a number of the cross-sectional views, such as FIG. 5, which is a cross-sectional view through section 5-5 of FIG. 2a.

Certain regions of the inner and outer panels 190 and 192 such as regions 200, 202, 204, 206 of the forward chamber 150 are configured to have the inner and outer panels touch or be coextensive, integral, or commonly connected (depending upon the technique used to form the air bag). As can be seen, these commonly connected regions 200-206 each generally comprises a shoulder or base 210, a neck 212 and a head 214. The construction of regions 200 and 204 is substantially similar, as the shoulder, neck and head are generally the same size and these regions are situated perpendicular to an imaginary line 205 extending through the periphery of the air bag proximate the regions 200 and 204. Region 202 is substantially similar to regions 200 and 204; that is, it also has a neck substantially narrower than its corresponding head 214. However, the region 202 is oriented at an angle A relative to the local periphery of the air bag, which is designated by numeral 220. As can be seen from the figures, region 202 is the closest to the openings 128 in tube 120 and will be impacted by a relatively high velocity stream of inflation gas schematically shown by arrow 125. The angular orientation of region 202 lessens stress build-up in the adjacent portions of the air bag during air bag inflation.

The reason for introducing these interconnected regions in the air bag is they also serve to reduce the inflatable capacity of the air bag and selectively reduce the pressure generated within the material forming the air bag as it rapidly inflates. The region 206 is similar to the other regions 200-204 in that it includes a shoulder, neck and head portion; however, the width of the neck approximates that of the head. The reason for this is it reduces cushion volume while at the same time provides adequate occupant head protection.

Figures 5, 6:
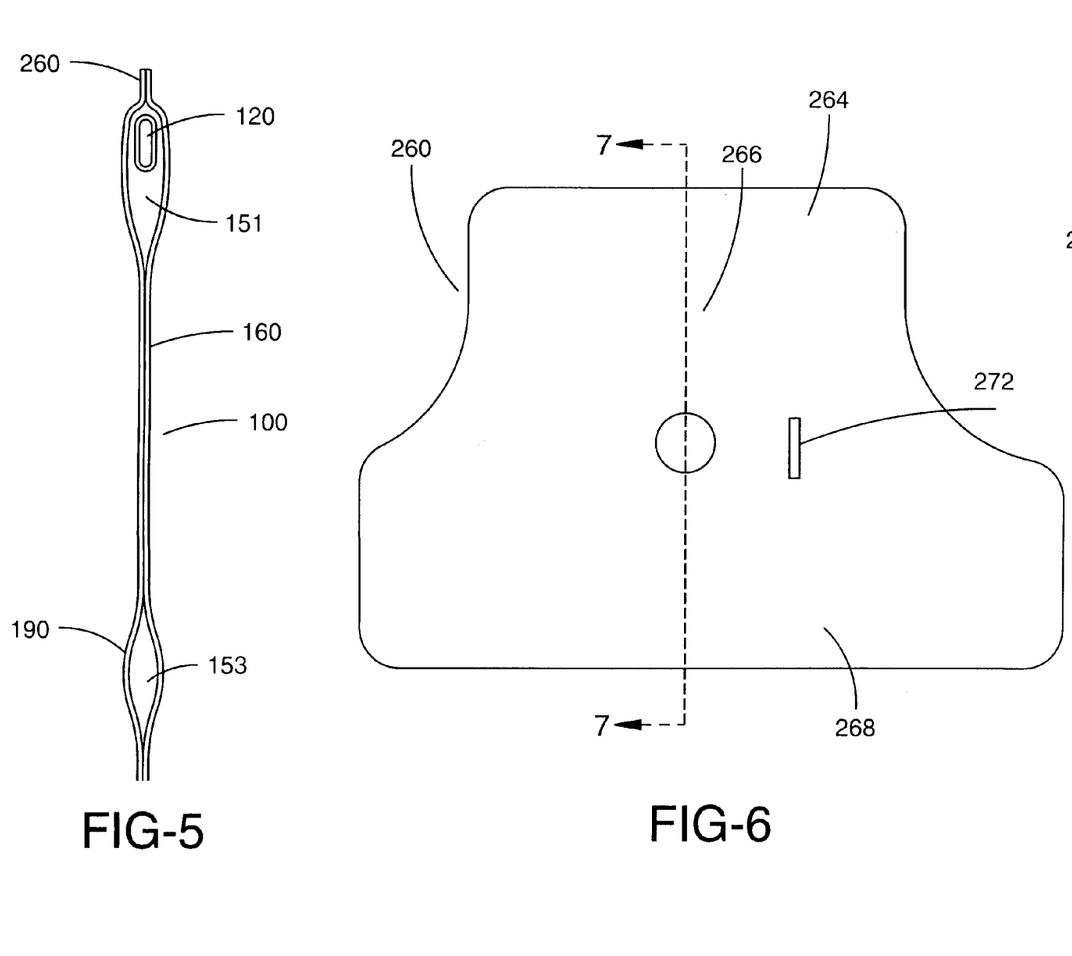
FIG. 5 is a cross-sectional view taken through section 5-5 of FIG. 2.
FIGS. 6 and 7 illustrate details of connecting or mounting tabs of the air bag.
Figure 7:
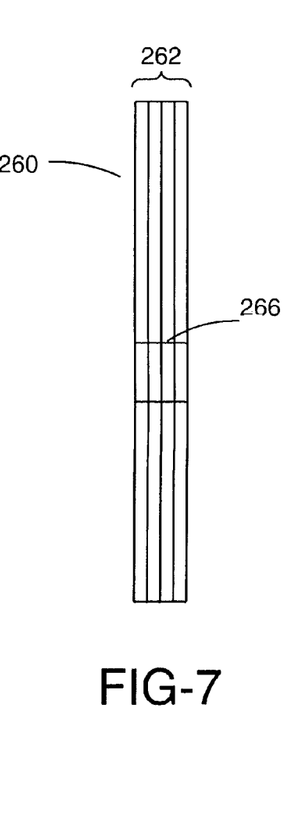

The air bag includes a plurality of tabs 260, which are shown in greater detail in FIGS. 6 and 7. Each tab is formed by a plurality of layers 262 of material, typically four pieces or panels of woven fabric. Each layer, piece or panel of woven material is laid on top of one another. Subsequently all of the layers are simultaneously laser cut. The laser cutting melts the periphery of each piece and in essence forms a peripheral weld 264 connecting each of the layers together as an integral. The resulting construction is a tab 260 having increased strength. A mounting opening 266 is formed within the tab by laser or die cutting. The lower edge 268 of the tab is sewn to the top portion 182 of the air bag by one or more lines of stitching 270. After the air bag 102 is fitted within the covering 102a, each tab 260 is pulled out of the covering through a slit 102b.

Reference is briefly made to FIG. 1. As can be seen, a center portion of the prior art curtain generally extends across the B-pillar; this is the case with the present invention. Typically this B-pillar also supports an anchor point called a D-ring of a seat belt system (not shown). In addition, various plastic trim parts (not shown) are attached to the metal under-structure forming the B-pillar. It is desirable to include within the air bag module a diversion mechanism, which acts as a deflector or ramp to urge the air bag, as it inflates, to move away from any potential obstructions formed on or by the B-pillar such as the D-ring and trim parts. The concept of utilizing such a ramp has been previously proposed in the art. As mentioned above the present invention utilizes a new and improved ramp mechanism illustrated in FIGS. 8-11.

Reference is briefly made to FIGS. 8-11 (as well as FIGS. 13-15), which illustrate the details of B-pillar ramps or deflectors 230 and 230a according to the present invention. The deflectors or ramps 230 and 230a are generally hollow in configuration and are preferably a plastic, extruded part having the configuration as shown. Each ramp 230 or 230a has a body 235 having a top 231, rear wall 232, a front wall 234 and a bottom 233. The top includes a down-turned leg or lip 236, which holds the top of the front side or wall 234 in place, prior to inflation, with the air bag positioned through the hollow body 235. The top 231 includes an opening 231a. Each ramp also includes a double or reinforced bottom 233. The bottom is formed as a tube 233a, which provides for increased stiffness of the body 235. The tube has a cross-section in the form of a multi-sided polygon having an upper wall or side 252 and a lower wall or side 254. Upper wall 252, in combination with sides. 232 and 234b, forms a cavity or chamber 253 (see FIG. 8, for example) for receipt of the air bag 102. Side 254 is formed of a number of segments such as segments 254a, b and c, in cooperation with upper side 252.

Figure 8:
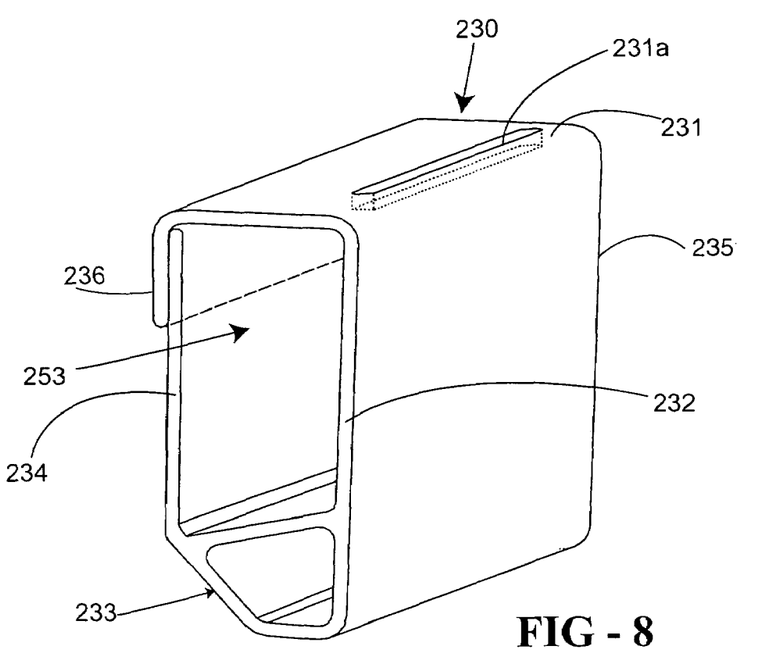
FIG. 8 illustrates an isometric view (closed configuration) of a B-pillar ramp or deflector.
Figure 8A:
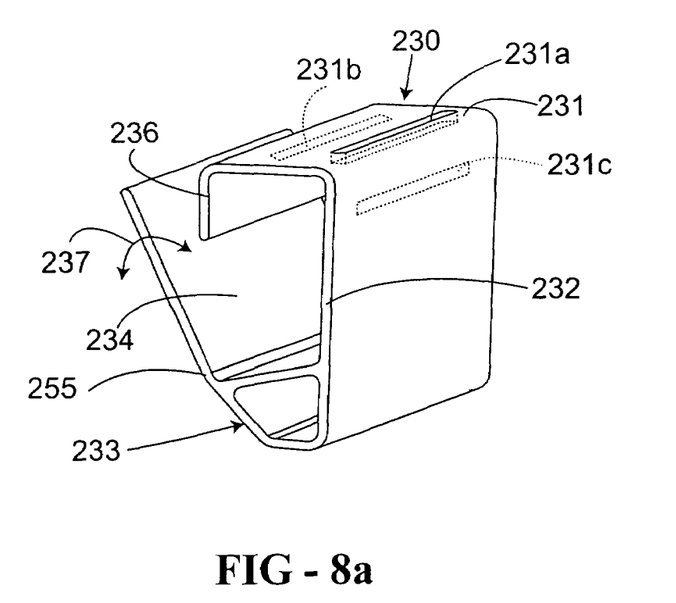
FIG. 8a is an isometric view of the ramp in an open configuration.
Figure 13:
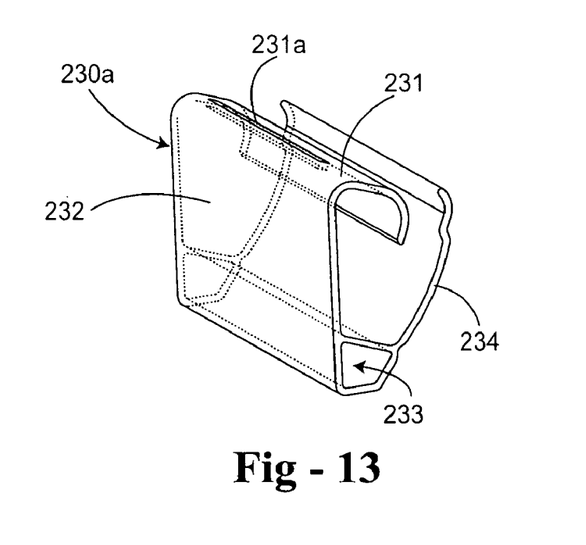
FIG. 13 is an isometric view of another embodiment of the invention.

When mounted to the roof rail, each ramp 230 or 230a is suspended or tethered from an air bag tab 260. In this position, bottom 233 lightly touches the top of the B-pillar trim 32a or is slightly spaced therefrom. Each deflector 230 shown in FIG. 8a or 230a of FIG. 13 is stamped or cut from a longer extrusion. As can be seen in FIG. 8a and in FIG. 15, the front wall 234 is positioned in front of the down-turned leg 236. After the ramp 230 or ramp 230a is placed about the folded air bag 102 (with or without covering 102a), the front side 234, which is flexible, is manipulated to lie behind the leg 236 (achieving the configuration shown in FIGS. 8 and 9 for ramp 230 and FIGS. 13 and 14 for 230a), which keeps it in place in the closed configuration.

Figure 14:
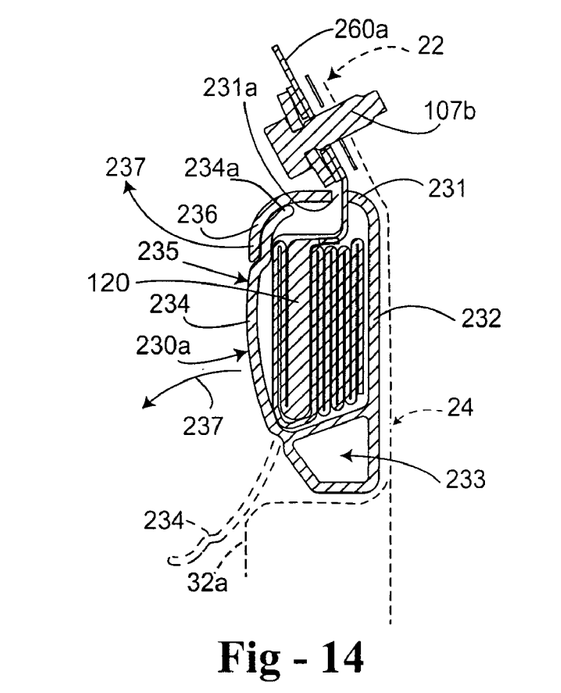
FIG. 14 shows a ramp in its mounted configuration.

In the embodiment of FIGS. 13 and 14, the leg 236 and top portion 231 are curved. Further, the top portion 234a and middle region 234b of front side 234 are arcuately shaped or bowed outwardly. The top portion 234a is configured to fit behind leg 236 as shown in FIGS. 13 and 14 and has the same curvature as leg 236.

In the illustrated invention the opening 231a is located toward the rear of the top 231; this is not a limitation of the invention. The opening 231a can be placed through other surfaces of the ramp 230 as shown in phantom lines in FIG. 8a, for example, at a more forward location on the top 231 (shown as opening 231b) or near the top of rear side 232 (shown as opening 231c). The tab, which extends through opening 231a, is located on the air bag so the base of the tab is adjacent the location of the opening 231a.

Figures 9, 9A, 10, 12:
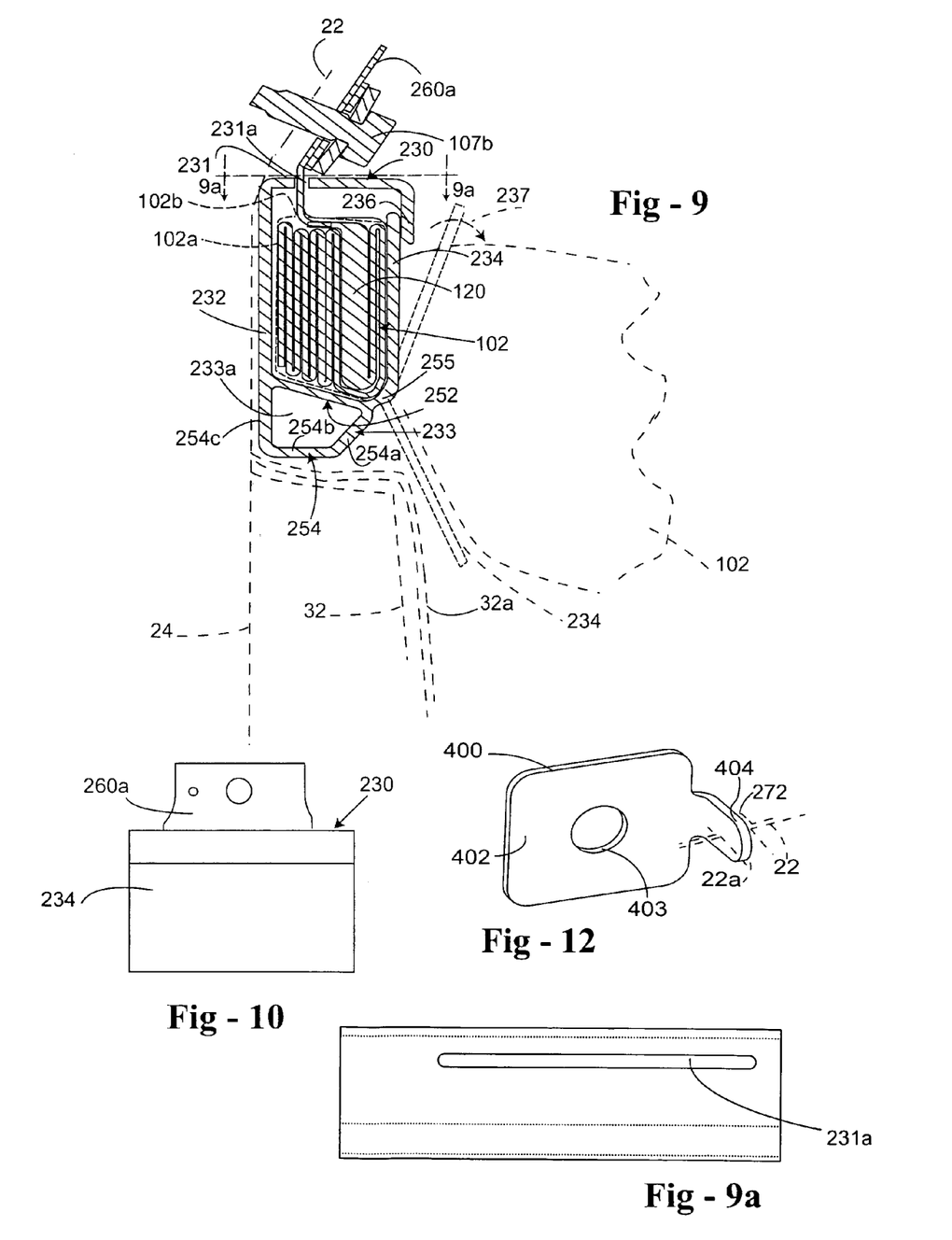
FIG. 9 illustrates a side view of the B-pillar ramp.
FIG. 9a is a top view of the B-pillar ramp.
FIG. 10 is a front view of the B-pillar ramp.
FIG. 12 shows an anti-rotation member used in conjunction with an air bag tab.

FIGS. 2, 9 and 11 illustrate the deflector 230 in its mounted configuration in a vehicle. FIG. 14 is a cross-sectional view showing ramp 230a in its mounted configuration. As can be seen, one of the tabs such as 260a of the air bag extends through opening 231a, and threaded fastener 107b extends through the mounting openings in tab 260a.

The above construction permits the lower portions of the deflector to stay intact during inflation of the air bag and to provide a region 255, forming a hinge (at the intersection of side 234 and upper side or wall 252 of the bottom 233), permitting side 234 of the deflector to rotate and be pushed forward of the down-turned leg 236 as the air bag inflates. One of the features of the present invention is the top of the side 234 and the top 231 are not secured together by a tear seam, which permits the side 234 to move away from the top with less effort and greater speed. The above-mentioned region 255 is located on an inboard side of the deflector and assists in cooperation with wall 234 in guiding the inflating air bag away from the B-pillar. The B-pillar trim can be installed before or after installation of the air bag 102 and ramp 230 (ramp 230a) providing flexibility in manufacturing steps. As can be appreciated, each ramp has a limited degree of motion, as it is not fixedly secured to either the vehicle or the B-pillar trim.

As the bag opens it expands and it urges inside wall 234 outwardly and away from the leg 236 in the direction of arrow 237 (see FIG. 9 or FIG. 13). Depending upon the relative stiffness of the wall 234 and leg 236, the leg 236 may be bent upwardly by motion of wall 234 or it may generally stay in place. After side 234 has rotated downwardly, it will be placed on the top of the B-pillar trim 32a (see FIG. 9) and between the B-pillar trim and the inflating air bag, protecting the air bag. This configuration will be achieved for the ramp 230a as well. In this configuration front wall 243 of ramp 230a is rotated onto the B-pillar trim as shown in FIG. 14. Numeral 234c is representative of the lowered portion of the front wall. FIG. 9 also shows the air bag as it is inflating. The deflector or ramp 230 essentially operates as a ramp, urging or deflecting the inflating air bag away from obstructions on the B-pillar that might prevent the air bag from fully extending or which might slow the inflation of the air bag due to, for example, rubbing friction between the air bag and those obstructions. It should be noted that the folded air bag 102 enclosed within its optional cylindrical casing or covering 102a is also shown in FIG. 8.

Figure 11A:
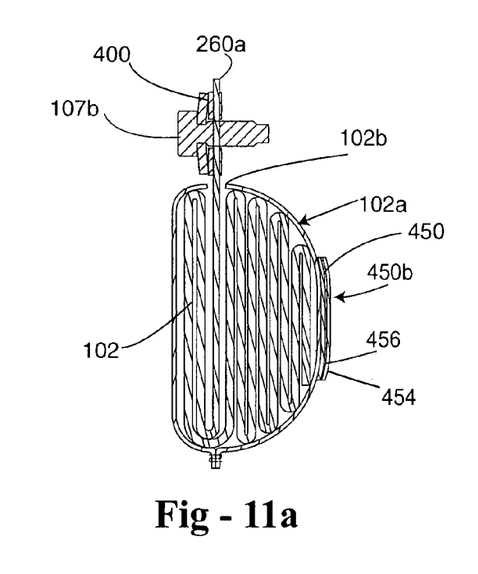
FIG. 11a is a cross-sectional view showing an alternate embodiment of the invention.
Figure 16:
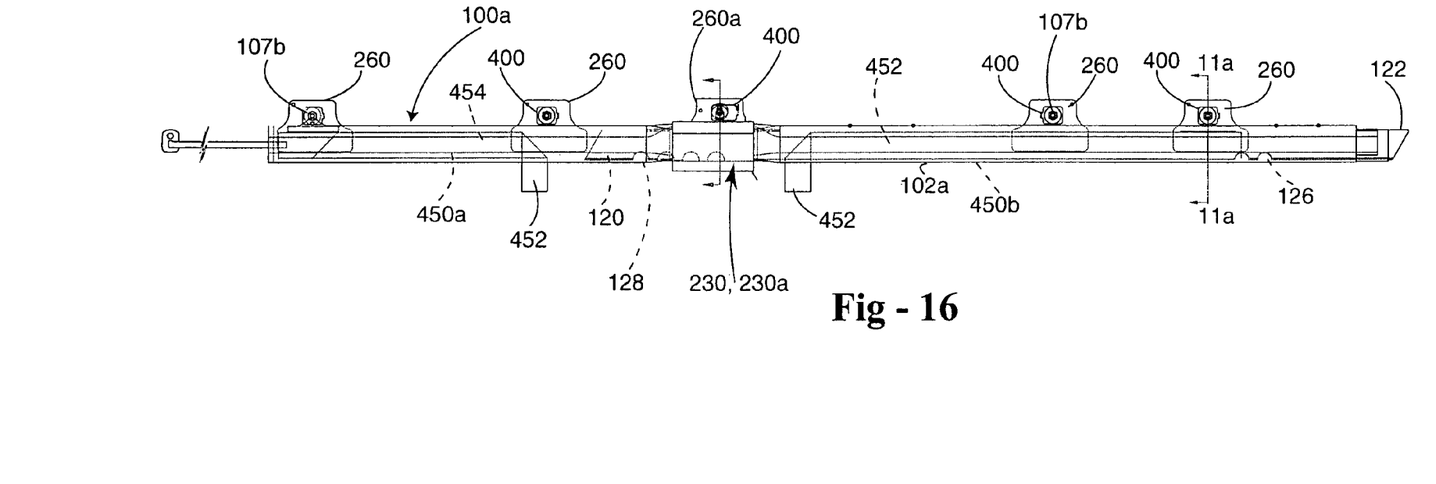
FIG. 16 shows an alternative embodiment of the invention.

Reference is made to FIG. 11a, which is a cross-sectional view through section 11a-11a of FIG. 16. In an earlier embodiment it was mentioned that the covering 102a could be held to the vehicle by a series of pushpins 107b. These pushpins have been eliminated in FIG. 11a, where two lengths of double-sided tape 450a and 450b have been attached to the rear of the covering 102a. As illustrated, length 450a is on one side of ramp 230, 230a and length of tape 250b is on an opposite side of the ramp 230, 230a. As can be seen, each length of tape 450a and 450b extends across all tabs on each side of the ramp. As can be appreciated, a greater number of shorter lengths of tape can be used. Number 452 represents a pull-tab that initially extends below the bottom of the covering 102a as shown in FIG. 16, which shows a module 100a with the double-sided tape 450a,b. As can be appreciated, the tape can be used with either ramp 230 and 230a. During installation of module 100a into the vehicle 24, the module is secured to vehicle 22 by fasteners 107b. Thereafter, each pull-tab 452 (see FIG. 16) and its associated adhesive protective layer 454 (which cover the adhesive 456) is removed exposing a layer of adhesive 456 (see FIG. 11a). The covering 102a and adhesive layer 456 are pushed against the roof rail 22.

Figure 15:
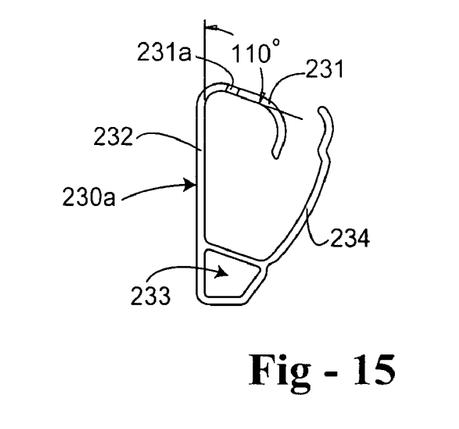
FIG. 15 is a side view of the ramp.

In regard to the embodiment of FIGS. 13-15, as the air bag expands, the curved front surface of top portion 234a slides upon the curved rear wall of leg 236. In view of the common curvature of these regions, less energy and time is needed to open ramp 230a than ramp 230, having a more rectangular shape.

In the preferred embodiment, the air bag 102 is integrally woven utilizing a Jacquard head and weaving process, which integrally forms the panels 190 and 192 and the peripheral edge of the air bag, as well as the non-inflated region and the commonly connected regions. As can be appreciated, the air bag can alternatively be manufactured by overlaying two substantially identical pieces of fabric and sewing them together to form the periphery and neck region, the non-inflated region and the neck region 110, and the commonly connected regions 200-206. Alternatively, and as known in the art, the air bag can be manufactured from one larger piece of fabric folded about its middle and sewn together along most-if not all of its other common sides. In this construction, the folded-over portion of the larger panel forms the lower edge of the air bag without the need to weave or sew separate panels together.

Each fastener 107b is received within an anti-rotation member 400 shown in FIG. 12 that assists in mounting each tab 260 to lie flat against the roof rail and prevents each tab 260 (260a) from rotating. The anti-rotation member 400 (see FIG. 12) includes a small plate 402 having an opening 403 therein for the fastener 107b and a projection or hook 404, which is pushed into a receiving slot 22a formed along the roof rail 22 of the vehicle. Each hook extends through a slot 272 (see FIG. 7) in a corresponding tab 260. Each member 400 is aligned to a respective tab 260 and the fastener 107b inserted therethrough. The combination of the fastener 107b and hook 404 keeps each air bag tab 260 in place.

Many changes and modifications in the above-described embodiment of the invention can, of course, be carried out without departing from the scope thereof. Accordingly, that scope is intended to be limited only by the scope of the appended claims.

The invention claimed is:

1. A combination of a deflector or ramp (230, 230a) for use in conjunction with an air bag module (100), the module comprising an air bag (102), the air bag when folded is configured to be placed proximate a roof rail (22) of a vehicle (24), the vehicle including a trim part (32a) covering a pillar (32) of the vehicle (24),
the ramp comprising a body (235) having a hollow cross-section, the body including a flexible top wall (231), a rear wall (232), a bottom (233) and a flexible front wall (234), the top wall configured to hold the front wall in place prior to inflation of the air bag, the top wall and front wall configured to permit the front wall to slide out from under the top wall as the air bag inflates; and
at least one flexible tab (260) which is part of the air bag and which extends through the ramp to loosely suspend or loosely tether the ramp to the vehicle.

2. The combination according to claim 1 wherein the front wall is configured to face an interior of a vehicle passenger compartment, prior to the inflation of the air bag with the air bag positioned through the hollow body, the front wall being separable from the top wall by action of the inflating air bag and configured to be moved by the inflating air bag to a position on a top portion of the trim part (32a) to prevent the inflating air bag from being damaged by the top of the trim part, the ramp including an opening (231a) through which the air bag tab extends.

3. The combination according to claim 2 wherein the top portion of the front wall is one of curved and flat.

4. The combination according to claim 3 wherein the curvature of the leg portion and the curvature of the top portion of the front wall are substantially the same.

5. The combination according to claim 4 wherein a middle portion of the front wall, below the top portion, is one of flat and curved.

6. The combination according to claim 1 wherein the tab is part of the air bag and extends through an opening in the ramp.

7. The combination according to claim 1 wherein the bottom is of a doubled wall construction.

8. The combination according to claim 2 wherein the opening is located in one of the top wall or rear wall.

9. The combination according to claim 1 wherein at least of portion of the air bag is fitted within a long narrow covering (102a) and wherein a layer of adhesive (456) is secured to a rear portion of the covering to secure the covering to a part of the vehicle.

10. A combination of a deflector or ramp (230, 230a) for use in conjunction with an air bag module (100), the module comprising an air bag (102), the air bag when folded is configured to be placed proximate a roof rail (22) of a vehicle (24), and above a trim part (32a) covering a pillar (32) of a vehicle (24), the air bag including at least one tab (260) extending from the air bag and through the ramp to loosely tether the ramp to the vehicle,
the ramp comprising a body (235) having a hollow cross-section, the body including a flexible top wall (231) with an opening to receive the tab, a rear wall (232), a bottom (233) and a flexible front wall (234), the front wall configured to face the interior of the vehicle, prior to the inflation of the air bag; the front wall is located behind a portion of the top wall with the air bag extending through the hollow body, the front wall being separable from the top wall by action of the inflating air bag, the front wall movable by the inflating air bag to a position on a top portion of the trim part (32a) to prevent the inflating air bag from being damaged by the top of the trim part, the ramp including an opening (231a) through which the air bag tab extends.

11. The combination according to claim 10 wherein the top wall includes a depending flexible leg portion 236 which is flexible and operatively connected to a top portion (234a) of the front wall and slidable relative to an underside of the leg portion as the air bag inflates.

12. The combination according to claim 10 wherein at least a portion of the air bag is fitted within a long narrow covering (102a) and wherein a layer of adhesive (456) is secured to a rear portion of the covering to secure the covering to a part of the vehicle.

13. A curtain air bag module for protecting occupants of a vehicle, the module comprising an air bag and a deflector or ramp, the vehicle having a passenger compartment and a pillar covered by a trim part, the trim part having an upper edge in proximity to the folded air bag and ramp, the air bag comprising at least one inflatable region, the air bag includable from its folded state to an inflated state extending into the passenger compartment and adjacent the trim part, the air bag including at least one flexible tab extending from a top of the air bag, the tab configured to be secured to the vehicle, the deflector or ramp configured to be placed about the folded air bag and located above a pillar trim part and suspended by the air bag tab, the ramp including an opening to receive the air bag tab, the deflector or ramp further including a flexible front wall that is movable upon inflation of the air bag from a first position adjacent the folded air bag to an active position atop the trim part;

wherein the top of the ramp includes a downward turned portion having an unsecured or free end and wherein an end of the front side of the ramp is locatable behind the downward turned portion prior to inflation of the air bag with the free end proximate the end of the front side and upon inflation of the air bag, the inflating air bag front side is configured to move or rotate away from the downward turned portion and covers a top of the trim part.

14. The air bag module as defined in claim 13 wherein the top of the ramp includes a downward turned portion and wherein the front side of the ramp is locatable behind the downward turned portion prior to inflation of the air bag and upon inflation of the air bag, the inflating air bag front side moves or rotates away from the downward turned portion and covers a top of the trim part.

15. The air bag module according to claim 10 wherein at least a portion of the air bag is fitted within a long narrow covering (102a) and wherein a layer of adhesive (456) is secured to a rear portion of the covering to secure the covering to a part of the vehicle.

16. The air bag module according to claim 10 wherein the flexible front wall (234) has a front wall end, the top wall configured to hold the front wall in place prior to inflation of the air bag, and the top wall includes a downwardly extending portion having a free end wherein the free end terminates in front of the front wall end.

17. The air bag module according to claim 10 wherein the flexible top wall includes a downwardly depending free end, the flexible front wall (234) having a front wall end, and the free end terminated in front of and proximate the front wall end.

18. The air bag module according to claim 13, wherein the top of the ramp includes a downward turned portion having an unsecured or free end and wherein and end of the front side of the ramp is locatable behind the downward turned portion prior to inflation of the air bag with the free end proximate the end of the front side and upon inflation of the air bag, the inflating air bag front side moves or rotates away from the downward turned portion and covers a top of the trim part.

* * * * *